United States Patent
Lawson

(10) Patent No.: US 10,791,709 B1
(45) Date of Patent: Oct. 6, 2020

(54) GROOMING SOCK FOR ANIMALS

(71) Applicant: Tanya Marie Lawson, Houston, TX (US)

(72) Inventor: Tanya Marie Lawson, Houston, TX (US)

( * ) Notice: Subject to any disclaimer, the term of this patent is extended or adjusted under 35 U.S.C. 154(b) by 0 days.

(21) Appl. No.: 14/693,285

(22) Filed: Apr. 22, 2015

Related U.S. Application Data

(60) Provisional application No. 62/030,216, filed on Jul. 29, 2014.

(51) Int. Cl.
*A01K 13/00* (2006.01)

(52) U.S. Cl.
CPC .................. *A01K 13/006* (2013.01)

(58) Field of Classification Search
CPC ... A01K 13/00; A01K 13/006; A01K 13/0007
USPC .............................................................. 2/158
See application file for complete search history.

(56) References Cited

U.S. PATENT DOCUMENTS

| | | | |
|---|---|---|---|
| 2,210,754 A * | 8/1940 | Frank .................. | A47K 7/02 15/227 |
| 2,424,172 A * | 7/1947 | Huddleston .......... | A01K 13/007 36/111 |
| 4,543,911 A * | 10/1985 | Marshall ............... | A01K 13/007 36/111 |
| 5,495,828 A * | 3/1996 | Solomon .................. | A01L 9/00 119/850 |
| 7,584,721 B2 * | 9/2009 | Vogelman ................ | A61D 9/00 119/850 |
| 2007/0271681 A1 * | 11/2007 | Heisler ................ | A01K 13/007 2/239 |
| 2011/0041779 A1 * | 2/2011 | Hurwitz ............... | A01K 13/007 119/850 |
| 2014/0150299 A1 * | 6/2014 | Entler .................. | A01K 13/007 36/111 |

FOREIGN PATENT DOCUMENTS

DE          29709329 U1 *  8/1997  .......... A01K 13/007

* cited by examiner

*Primary Examiner* — Christopher D Hutchens
(74) *Attorney, Agent, or Firm* — Kenneth A. Roddy

(57) ABSTRACT

Some embodiments of the present disclosure include a device for preventing an animal's fur from getting caught in a nail grooming tool. The device may include a sock configured to accommodate an animal's paw therein, the sock being made of a mesh layer attached to a fabric layer, wherein an edge of the mesh layer and the fabric layer are not attached, forming an opening into the interior of the sock. Some embodiment of the device may further include at least one elastic loop extending from the sock, the loop being configured to secure the sock onto the animal's paw.

1 Claim, 4 Drawing Sheets

GROOMING SOCK FOR ANIMALS

RELATED APPLICATION

This application claims priority to provisional patent application U.S. Ser. No. 62/030,216 filed on Jul. 29, 2014, the entire contents of which is herein incorporated by reference.

BACKGROUND

The present invention relates generally to pet accessories, and more particularly, to a grooming sock for animals to prevent hair or fur from being tangled or ripped out by a fast spinning rotary tool.

Some animals, such as dogs cannot tolerate having their claws or nails clipped. Clippers can crack the nail, or worse, cut through to the quick, which is the bundle of nerves and veins in each claw. Using a rotary grooming tool prevents cracking or cutting into the quick, but the fast spinning barrel of the rotary tool can tangle or rip out long paw fur and hair surrounding the claw or nail.

Therefore, what is needed is a device for preventing the animal's paw hair or fur from being tangled in a rotary grooming tool, while simultaneously allowing the claws or nails to be groomed using the rotary tool. As used in conjunction with the present invention, the term "mesh fabric" is defined as a type of fabric characterized by its net-like open appearance, and the spaces between the yarns. Mesh is available in a variety of constructions including wovens, knits, laces, or crocheted fabrics. (www.fabric.com/SitePages/Glossary.aspx).

SUMMARY

The present invention is directed toward a grooming sock for placement on the paw of an animal to prevent the animal's hair or fur from being caught or tangled in a rotary grooming tool during trimming of the animal's nails. The grooming sock has an elongate generally U-shaped configuration formed of a mesh fabric bottom layer and a non-mesh fabric top layer that are attached together along their peripheral edges and unattached at one end edge defining an interior having an open end to accommodate the paw of the animal. The mesh fabric bottom layer has a plurality of openings sized to allow the animal's nails to pass therethrough, while simultaneously retaining long paw fur and hair surrounding the nails within the interior of the sock. Some embodiments may include at least one elastic loop secured at one end to a peripheral edge of the sock of sufficient length to wrap around the sock and the animal's paw to secure the sock in place while in use.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
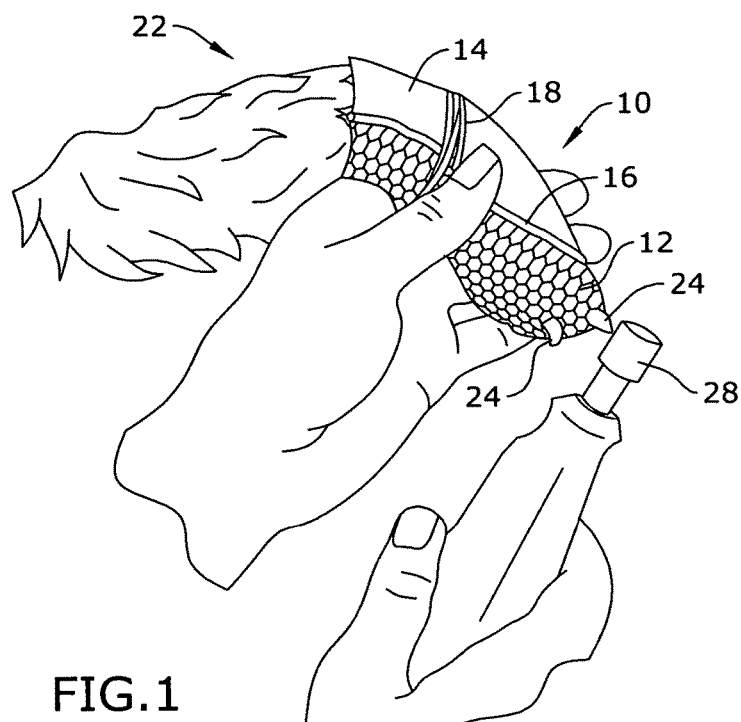
FIG. 1 is a perspective view of one embodiment of the present invention, shown in use.
Figure 2:
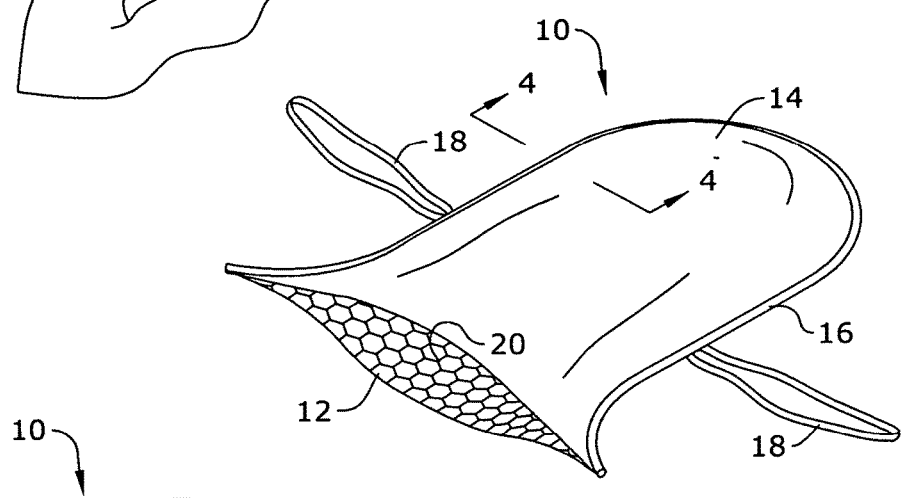
FIG. 2 is a top perspective view of one embodiment of the present invention.
Figure 3:
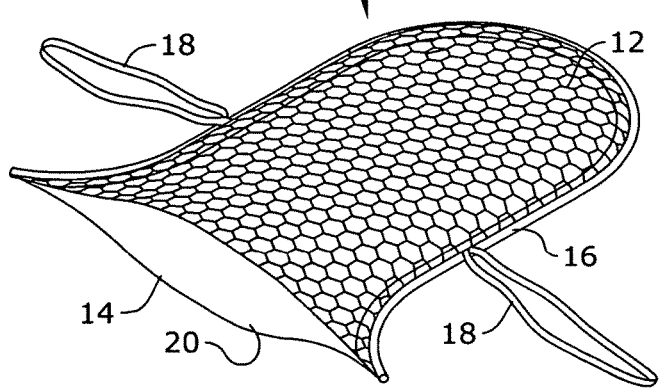
FIG. 3 is a bottom perspective view of one embodiment of the present invention.
Figure 4:
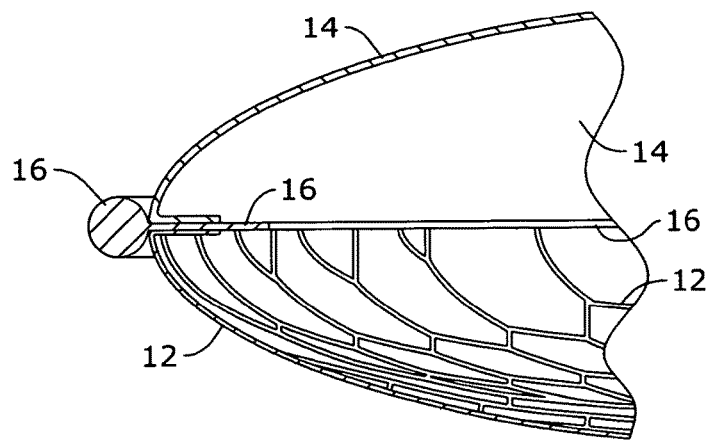
FIG. 4 is a detail section view of one embodiment of the present invention, taken along line 4-4 in FIG. 2.
Figure 5:
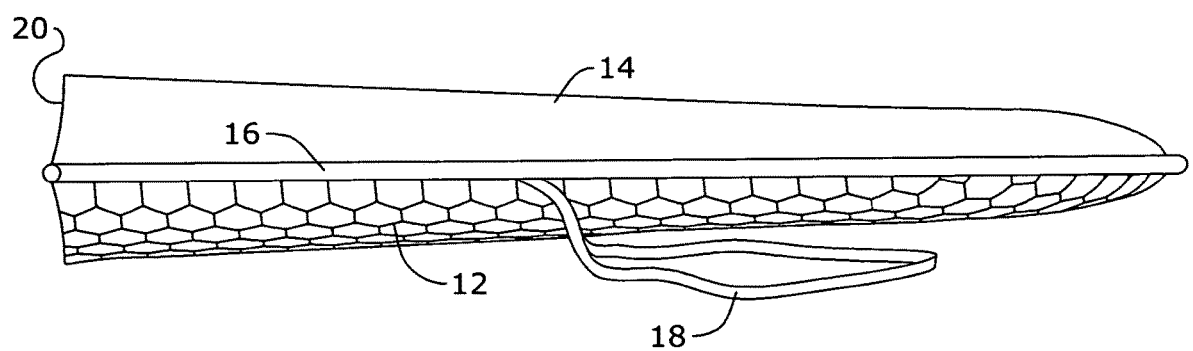
FIG. 5 is a side view of one embodiment of the present invention.
Figure 6:
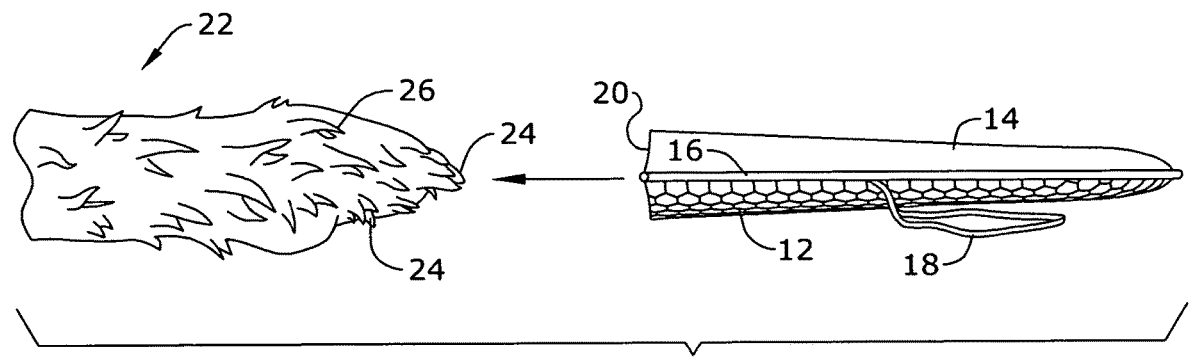
FIG. 6 is a side view of one embodiment of the present invention.
Figure 7:
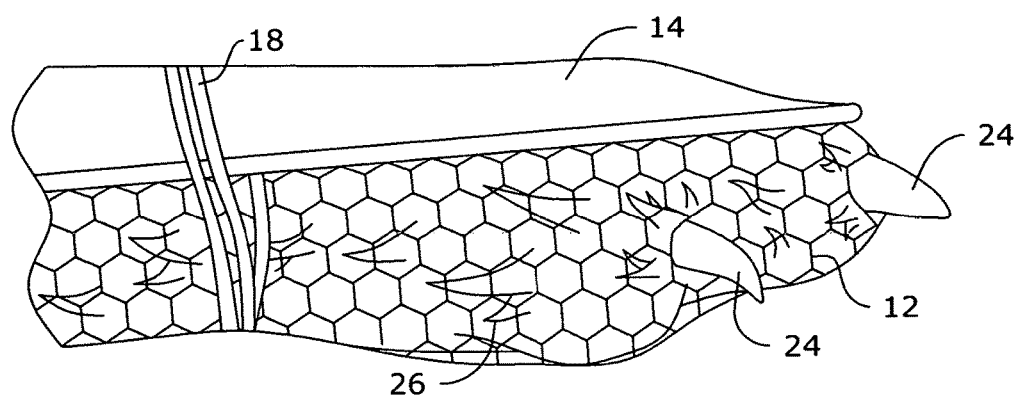
FIG. 7 is a side view of one embodiment of the present invention.

In the following detailed description of the invention, numerous details, examples, and embodiments of the invention are described. However, it will be clear and apparent to one skilled in the art that the invention is not limited to the embodiments set forth and that the invention can be adapted for any of several applications.

The various elements of the grooming sock for protecting paw hair or fur from being tangled in a grooming tool of the present disclosure may be related in the following exemplary fashion. It is not intended to limit the scope or nature of the relationships between the various elements and the following examples are presented as illustrative examples only.

Referring now to FIGS. 1-8, there is shown a grooming sock 10 configured to accommodate an animal's paw 22 therein, the grooming sock 10 comprising a mesh fabric bottom layer 12 attached to a non-mesh fabric top layer 14, wherein an edge of the mesh fabric bottom layer 12 and the non-mesh fabric top layer 14 are not attached, forming an opening 20 into the sock. The openings of the mesh fabric bottom layer 12 are sized to allow the animal's claws or nails 24 to extend therethrough, while simultaneously preventing the animal's fur or hair 26 from extending therethrough, keeping the hair 26 within the interior of the sock 10 such that the hair 26 is prevented from being tangled or caught in a grooming tool, such as a rotary grooming tool 28. The mesh fabric bottom layer 12 may also provide breathable comfort to the animal to avoid overheating as sweat glands are generally present in an animal's paws. Moreover, the sock 10 may also be used to prevent skin infections and to prevent an animal from licking his or her paws after the application of medicine.

In some embodiments, the device may further comprise at least one loop 18, or a pair of loops 18, extending from an outer edge of the sock 10, wherein the loop or loops 18 is are configured to wrap around the sock 10 and the animal's paw 22, securing the sock 10 in place while in use. The loops 18 may be made of an elastic material, such as ⅛ inch elastic. The device may further comprise a piping 16 running along the seam of the mesh layer 16 and the fabric layer 14.

The mesh fabric bottom layer 12 may comprise any mesh suitable for retaining hair 26 within the sock 10, while simultaneously allowing claws 24 to extend through the openings of the mesh layer 12 to the exterior of the sock 10. Depending on the size of the animal or the paw, the size of the mesh fabric material and openings in the mesh fabric material may vary. For example, for a smaller animal, the size of the mesh fabric material and openings of the mesh layer 12 may be about 3 mm mesh with openings of about 0.118" or 2.997 mm, while for a larger animal, the openings of the mesh layer 12 may be about 7 mm mesh with openings of about 0.118" or 2.997 mm.

The non-mesh fabric top layer 14 may comprise any desired fabric and, in some embodiments, comprises a soft, knit material. However, use of other fabrics is envisioned.

The non-mesh fabric top layer 14 may have similar dimensions to the mesh fabric bottom layer 12, such that they can be attached to form a neatly shaped sock 10.

The mesh fabric bottom layer 12 and the non-mesh fabric top layer 14 may be attached using any known or desired fastening mechanism. For example, in some embodiments, the edges of the layers may be sewn together using, for example, a cotton thread. In other embodiments, the edges may be adhered together using an adhesive.

Figure 8:
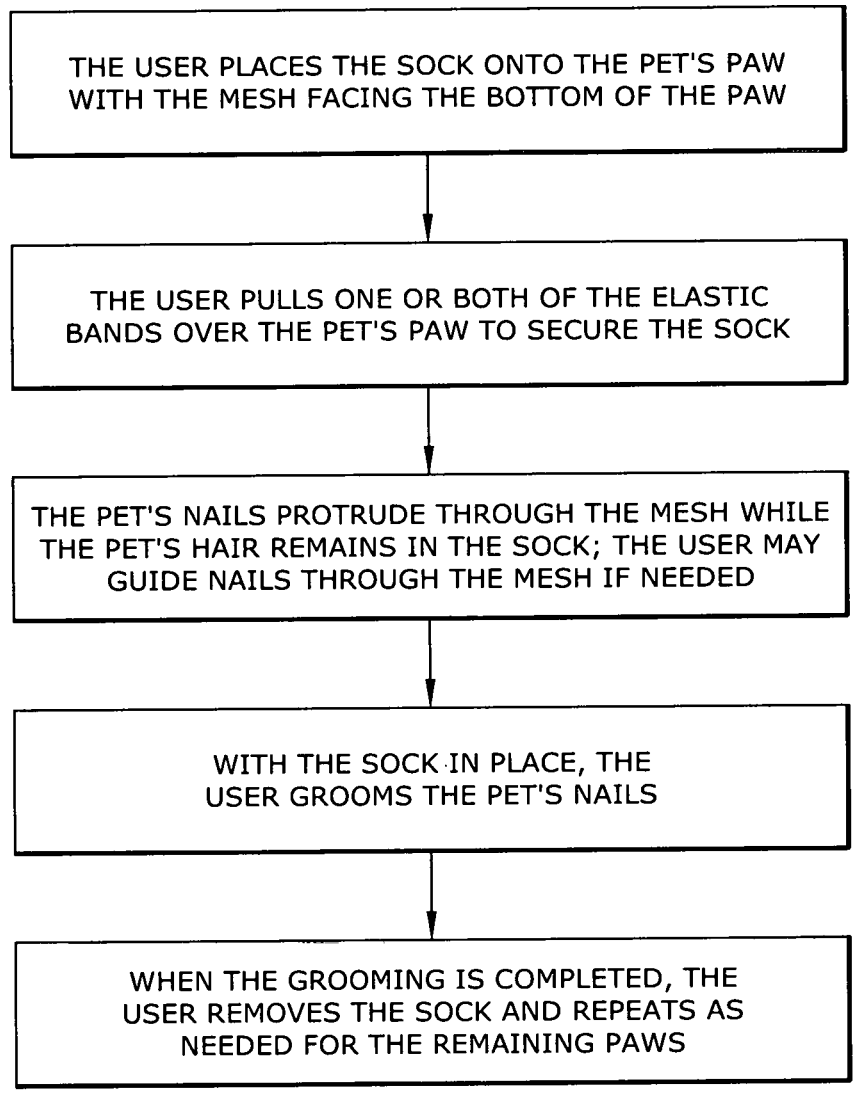
FIG. 8 is a flow chart describing an exemplary use of one embodiment of the present invention.

As illustrated in FIG. 8, to use the grooming sock, a user places the sock 10 onto the animal's paw 22 by putting the paw 22 into the opening 20 with the mesh fabric bottom layer 12 being positioned against the bottom of the paw 22 and the non-mesh fabric top layer 14 being positioned against the top of the paw 22. The user may optionally pull at least one loop 18 over the 22 sock 10 to secure the sock onto the paw 22. When the paw 22 is placed into the sock 10, the nails 24 may extend through the openings of the mesh layer 12, while the hair 26 remains in the interior of the sock 10. If needed, a user may guide the nails 24 through the mesh layer 12. With the sock 10 in place, the user may groom the animal's nails 24 using a rotary grooming tool 18. When the grooming is completed, the user may remove the sock 10 from the paw 22.

Persons of ordinary skill in the art may appreciate that numerous design configurations may be possible to enjoy the functional benefits of the invention. Thus, given the wide variety of configurations and arrangements of embodiments of the present invention the scope of the invention is reflected by the breadth of the claims below rather than narrowed by the embodiments described above.

What is claimed is:

1. A grooming sock for placement on the paw of an animal to prevent the animal's long paw hair or fur from being caught or tangled in a rotary grooming tool during trimming of the animal's nails, the grooming sock comprising:

a bottom layer formed of mesh fabric material having a plurality of adjacent openings and a mesh size in the range of from about 3 mm to about 7 mm mesh, said bottom layer having a contiguous U-shaped perimeter with a contiguous straight end, an opposed semicircular end, and laterally opposed sides;

a top layer formed of non-mesh fabric material having a contiguous U-shaped perimeter with a contiguous straight end, an opposed semicircular end, and laterally opposed sides;

said mesh bottom layer said top layer sewn together along their said semicircular end and laterally opposed sides, respectively, to define an interior having an open end;

said interior configured to receive and accommodate the paw of the animal with said top layer of non-mesh fabric material covering a top portion of the paw, said bottom layer of mesh fabric material covering a bottom portion of the paw, and said plurality of openings of said recited mesh size of said mesh fabric material allowing each of the animal's nails to pass through selected openings, respectively, and simultaneously retain the long paw hair or fur surrounding the nails within said interior to prevent the surrounding paw hair or fur from being caught or tangled in the rotary grooming tool during trimming of the animal's nails; and at least one loop secured at one end to a lateral side edge of said grooming sock of sufficient length to wrap around said sock and the animal's paw to secure said sock in place on the animal's paw during the trimming operation.

\* \* \* \* \*